United States Patent [19]

Chaumont

[11] 3,883,191
[45] May 13, 1975

[54] ENDLESS TRACK
[75] Inventor: Guy Noel Chaumont, Tring-Jonction, Quebec, Canada
[73] Assignee: Dayco Corporation, Dayton, Ohio
[22] Filed: Apr. 8, 1974
[21] Appl. No.: 458,958

[52] U.S. Cl............................... 305/35 EB; 180/6.7
[51] Int. Cl............................................ B62d 55/25
[58] Field of Search.......... 305/35 R, 35 EB, 36, 37, 305/38, 39; 180/6.7, 9.2 R; 152/171, 209, 212

[56] References Cited
UNITED STATES PATENTS

| | | | |
|---|---|---|---|
| 933,110 | 9/1909 | Rempes............................ | 152/209 R |
| 3,160,190 | 12/1964 | Jediny............................. | 152/209 R |
| 3,426,823 | 2/1969 | Rieger.............................. | 152/171 |
| 3,756,668 | 9/1973 | Russ................................ | 305/35 EB |

Primary Examiner—Philip Goodman
Assistant Examiner—John A. Carroll

[57] ABSTRACT

An endless track is provided and has a main body made primarily of an elastomeric material and is adapted to be moved in an endless path having a longitudinal axis; and, the main body comprises an inside surface and a ground engaging surface with the ground engaging surface including a main surface and a plurality of ribs arranged in a cellular pattern defined by a plurality of cells with each of the cells having at least one rib thereof arranged at an acute angle with the axis. The ribs are adapted to provide continuous support for the track, resist sliding movement of the track transverse the axis, and confine flowable material, such as snow and mud, on which the track may be supported to minimize sinking thereof during operation of the track.

9 Claims, 4 Drawing Figures

PATENTED MAY 13 1975 3,883,191
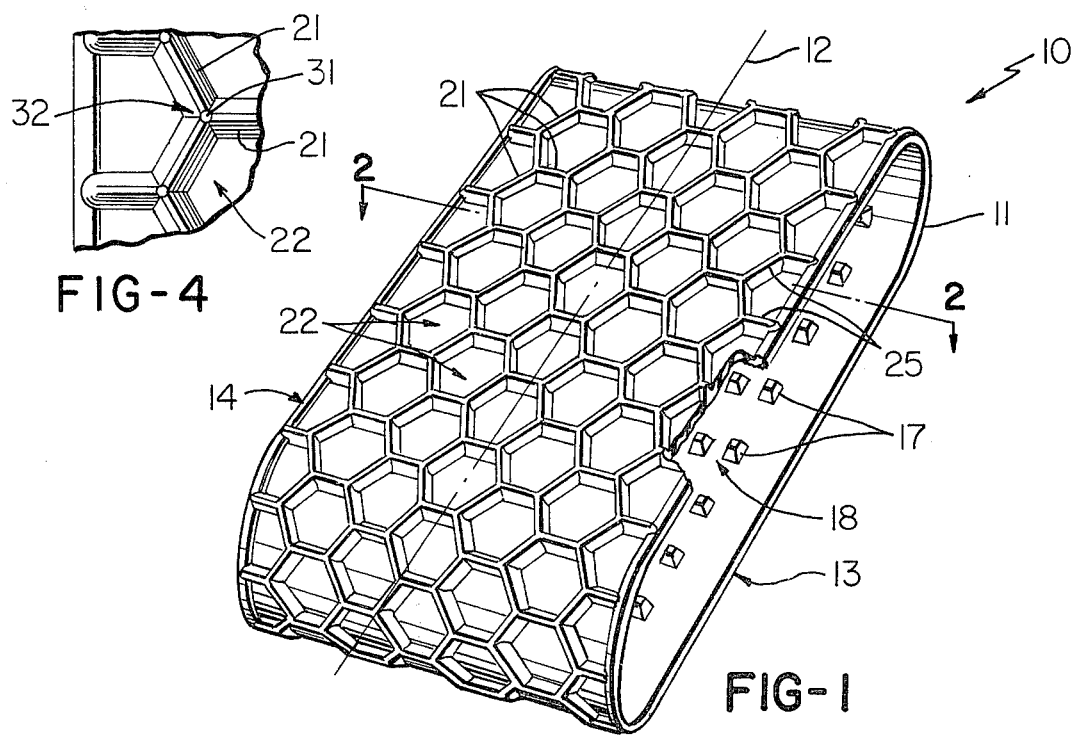
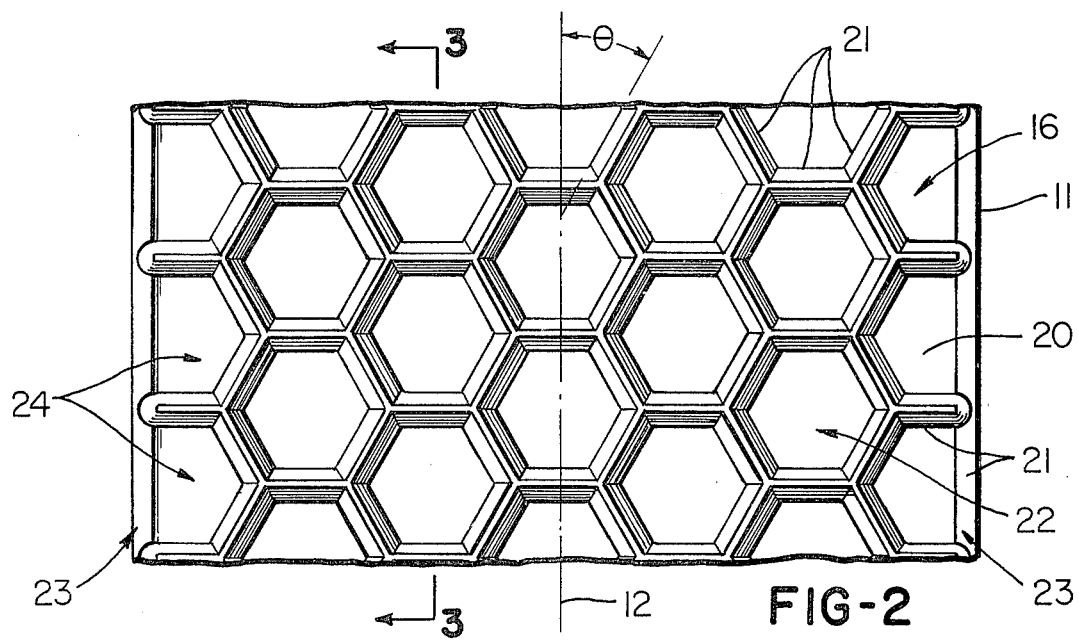
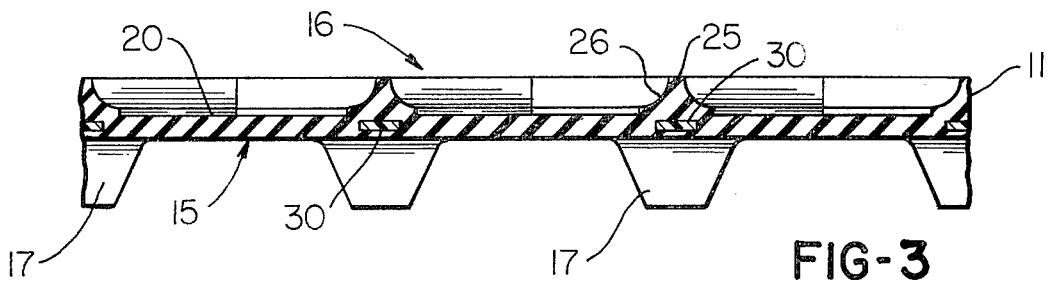

ENDLESS TRACK

BACKGROUND OF THE INVENTION

There are numerous endless traction belts or tracks in current use which are made primarily of elastomeric materials and are used on snowmobiles, tractors, and similar vehicles. In general, each of these currently used tracks has ribs or projections comprising its ground engaging surface which are arranged in spaced parallel relation perpendicular to the longitudinal axis of the endless path in which the track is adapted to be moved. Each of these currently used tracks with perpendicular ribs of the character mentioned has numerous problems including rough operation which causes vibration of the track and the vehicle supported thereby, a tendency to slide in a direction transverse the longitudinal axis of the endless path through which the track moves with such sliding being of the type which might occur in a rapid turn or during operation on a hillside, and a tendency to sink more easily into snow, mud, and similar unstable material.

SUMMARY

This invention provides an endless track of simple yet economical construction which substantially minimizes problems of the character mentioned above. In particular, such track has a main body made primarily of an elastomeric material and is adapted to be moved in an endless path having a longitudinal axis; and, the main body comprises an inside surface and a ground engaging surface with the ground engaging surface including a main surface and a plurality of ribs arranged in a cellular pattern defined by a plurality of cells with each of the cells having at least one rib thereof arranged at an acute angle with the axis. The ribs are adapted to provide a continuous support for the track, resist sliding movement of the track transverse the axis, and confine relatively unstable flowable material, such as snow and mud, on which the track may be supported to minimize sinking thereof during operation of the track.

Other details, uses, and advantages of this invention will be readily apparent from the embodiments thereof presented in the following specification, claims, and drawing.

BRIEF DESCRIPTION OF THE DRAWING

The accompanying drawing shows present preferred embodiments of this invention, in which FIG. 1 is a perspective view of one exemplary embodiment of an endless track of this invention;

FIG. 2 is an enlarged fragmentary plan view taken essentially on the line 2—2 of FIG. 1;

FIG. 3 is a fragmentary cross-sectional view taken essentially on the line 3—3 of FIG. 2; and FIG. 4 is a fragmentary plan view of a portion of a modified version of the track of FIG. 1 showing antiskid metal pins or studs installed therein.

DESCRIPTION OF ILLUSTRATED EMBODIMENTS

Reference is now made to FIG. 1 of the drawing which illustrates one exemplary embodiment of an endless traction belt, which is referred to hereinafter simply as an endless track, of this invention which is designated generally by the reference numeral 10 and such track is of the type particularly adapted to be used on a motor driven vehicle such as a tractor, snowmobile, or the like; and, the track 10 has a main body 11 which is made primarily of an elastomeric material which may be in the form of a natural or synthetic rubber, any suitable polymer, such as polyurethene, or the like.

The track 10 of this example is an inside drive type track which is particularly adapted to be moved in an endless path having a longitudinal axis 12 using associated drive means (not shown) of the vehicle (also not shown) employing such track and the endless path includes a ground engaging rectilinear portion 13 and a rectilinear portion 14 arranged parallel to the ground engaging portion with rectilinear portions 13 and 14 extending parallel to longitudinal axis 12 of the track 10.

As seen particularly in FIGS. 2 and 3 of the drawing the main body 11 has an inside surface 15 and a ground engaging surface 16; and, the main body 11 has a plurality of projections 17 extending from its inside surface 15 and such projections are preferably provided as an integral part thereof. The projections 17 of this example are substantially frustopyramidal projections (see FIG. 1) arranged in spaced relation along the endless path of the track 10 and in two pairs of parallel rows with each pair being designated by the general reference numeral 18 and each pair of rows 18 being arranged adjacent a side edge of the track 10. The projections 17 are adapted to be engaged by a cooperating pair of inside type drive sprockets (not shown) with each sprocket being adapted to serially engage projections 17 of an associated row 18 in a manner known in the art and thereby drive the track 10 in its endless path.

The ground engaging surface 16 comprises a main surface 20 and a plurality of ribs each designated by the same reference numeral 21 which are arranged in a cellular pattern defined by a plurality of cells each designated generally by the reference numeral 22. As will be apparent from FIG. 2 each of the cells has at least one rib 21 thereof arranged at an acute angle $\theta$ with the axis 12. The ribs 21, due primarily to the cellular arrangement thereof, are adapted to provide continuous support for the track 10 and its associated vehicle, resist sliding movement of the track transverse the axis 12, and confine the movement of flowable material such as snow, mud, and the like on which the track 10 may be operated to prevent the track from sinking. For example, during this confining action the ribs 21 of each cell 22 serve as walls or barriers which prevent the mud, snow, or the like from being squeezed out from under the track 10 with a net effect of preventing the track and its vehicle from sinking excessively.

The cellular arrangement of the ribs 21 is in the form of a substantially honeycomb pattern which provides continuous support for the track and a substantial reduction of vibration. In addition with the arrangement of at least two ribs 21 of each cell 22 at an acute angle $\theta$ with the axis 12 and hence with the direction of travel of the endless belt 10 the angularly arranged ribs tend to wipe water from a wet hard pavement over which the track may be operated to thereby help provide a comparatively dry contact and greater traction. In addition, the cellular arrangement serves to provide a vacuum effect which also increases the traction. Also, as the track 10 is bent around a rear idler associated therewith the vacuum is broken without loss of traction yet without imposing unnecessary stresses on the track.

The ribs 21 of the track 10 comprise a pair of side ribs as shown at 23 arranged in parallel relation and defining opposite side edges of the track whereby the cells 22 include nonsymmetrical cells 24 adjoining the parallel side ribs indicated at 23 and all other cells 22 are each in the form of a regular polygon. In this example, all of the other cells are in the form of a regular hexagon, with the hexagonal cells being of equal size.

Each of the ribs 21 terminates in a flat outermost surface 25, see FIG. 1, of controlled width thereby preventing premature wear of the ribs 21. Further, each of the ribs 21 other than the parallel side ribs indicated at 23 has a pair of arcuate outwardly concave side walls each designated by the reference numeral 30 which terminate in an associated flat outermost surface 25. The outermost surfaces 25 of all ribs 21 are substantially parallel to the main surface 20 of the ground engaging surface 16 when viewing the track in cross section.

The track 10 has suitable reinforcing means therein and in this example is shown as having a plurality reinforcing members 30 of rectangular cross-sectional configuration which extend substantially across the full width of the track 10 and are embedded in the main body portion 11. The reinforcing members 30 are made of a nonmetallic material such as a high-strength fiber glass, or the like, however, it will be appreciated that the members 30 may be made of any suitable nonmetallic or metallic material and need not necessarily have a rectangular cross-sectional but may have some other non-circular configuration as well as a circular cross-sectional configuration.

The cells 22 defined by those ribs 21 which are arranged away from the cells 22 adjoining the parallel ribs at 23 are shown and described in this disclosure as being in the form of a hexagon; however, it will be appreciated that any regular polygon may be employed including diamond-shaped, square, octagonal, and the like, provided that in each regular polygonal cell 22 defined by ribs 21, at least one rib of the cell is arranged at an acute angle $\theta$ with the longitudinal axis 12.

The track of this invention may be modified in the manner illustrated in FIG. 4 to provide metal pins or studs 31 at the intersection of ribs 21 of adjoining cells 22 and as illustrated at 32 whereby such a modified track with its studs 31 would be useable to provide antiskid protection on ice. The manner in which the pins 31 may be installed in the elastomeric main body 11 is well known in the art and need not be described herein and the materials used to define pins 31 is also well known.

The main body portion 11 of the belt 10 is crosshatched in the drawing to indicate rubber; however, as previously indicated it will be appreciated that any suitable elastomeric material may be used to define the main body of the track 10. In addition, it will be appreciated that the belt 10 may employ additional reinforcing means therein of the type which are well known in the art whereby it is to be understood that the concept of this invention utilizing a plurality of ribs arranged in a cellular pattern defined by a plurality of cells as described herein is fully applicable to an endless track similar to the track 10 having other types of reinforcing means embedded therein.

The concept of this invention is also fully applicable to an endless track having ribs similar to the ribs 21 arranged to define a cellular pattern having cells 22 wherein the cells 22 are not in adjoining relation but may be in spaced relation from each other and in any suitable geometric pattern provided that each of the cells thus arranged in spaced relation has at least one rib thereof arranged at an acute angle with the longitudinal axis of its associated belt and essentially as illustrated and described herein.

In this disclosure of the invention, the cells 22 in the central portion of the track 10 are shown as hexagonal cells and in one application of this invention it was found that exceptionally good results were obtained by spacing each pair of parallel ribs of a particular cell 22 roughly 2 to 2½ inches. In addition, the ribs 21 preferably extend from the main surface 20 so that the surface 25 of each rib is approximately ⅝ inch from surface 20.

While present exemplary embodiments of this invention and methods of practicing the same, have been illustrated and described, it will be recognized that this invention may be otherwise variously embodied and practiced within the scope of the following claims.

What is claimed is:

1. An endless track having a main body made of an elastomeric material and being adapted to be moved in an endless path having a longitudinal axis, said main body comprising an inner surface and a ground engaging outer surface; said outer surface including a central portion comprising a plurality of ribs defining regular hexagonal cells, each of said cells having ribs arranged at an acute angle with said axis to provide continuous support for said track; said outer surface further comprising side ribs defining the outermost edges of said track, said side ribs and the adjacent angled ribs forming nonsymmetrical cells outward of said central portion.

2. A track as set forth in claim 1 in which said ribs are provided as an integral part of said main body and extend from said main surface a substantially equal distance.

3. A track as set forth in claim 1 in which each of said ribs terminates in a flat outermost surface.

4. A track as set forth in claim 1 in which said ribs have arcuate side walls which terminate in a flat outermost surface which is substantially parallel to said main surface when viewing said track in cross-section.

5. A track as set forth in claim 4 in which each pair of arcuate side walls is concave outwardly away from said main surface.

6. A track as set forth in claim 1 and further comprising a plurality of reinforcing members embedded in said main body and extending perpendicular to said axis.

7. A track as set forth in claim 6 in which each of said reinforcing members is made of a nonmetallic material and said main body is made of a rubber compound.

8. A track as set forth in claim 1 and further comprising a plurality of projections extending from said inner surface of said main body, said projections being adapted to be engaged by associated driving members to move said track in said endless path.

9. A track as set forth in claim 8 in which said projections are provided as an integral part of said main body and each of said projections has a frustopyramidal configuration.

* * * * *